United States Patent [19]

Roedel et al.

[11] 3,927,265

[45] Dec. 16, 1975

[54] DATA MODEM HAVING LINE VERIFICATION AND AUTOMATIC DISCONNECT FEATURES

[75] Inventors: Charles W. Roedel, Miami Shores; Richard Borysiewicz, Miami, both of Fla.

[73] Assignee: Milgo Electronics Corporation, Miami, Fla.

[22] Filed: Jan. 31, 1974

[21] Appl. No.: 438,386

[52] U.S. Cl. .............................................. 179/2 DP

[51] Int. Cl.[2] .......................................... H04M 11/06

[58] Field of Search ........... 179/2 DP, 170.2, 170.4, 179/170.6; 178/66 R

[56] References Cited

UNITED STATES PATENTS

| | | | |
|---|---|---|---|
| 3,427,401 | 2/1969 | Waddell | 179/2 DP |
| 3,647,993 | 3/1972 | Foulkes et al. | 179/170.2 |
| 3,783,194 | 1/1974 | Vilips et al. | 179/2 DP |

*Primary Examiner*—Kathleen H. Claffy
*Assistant Examiner*—C. T. Bartz
*Attorney, Agent, or Firm*—Jackson & Jones

[57] ABSTRACT

Modems including line verification circuits for automatically advising that a direct distance dialed network has been connected between the communicating modems with echo suppressors in the network disabled, is disclosed. The line verification circuitry is either identical for all modems or may be master/slave equipment. The line verification circuitry includes a first tone generator for emitting a unique tone for disabling echo suppressors in the telephone line. A tone generator at a communicating modem, upon receiving the unique tone, emits a different tone which is not capable of disabling the echo suppressors but is capable of transmission through the telephone line when the echo suppressors are disabled. In one preferred embodiment, the second tone is near the limit of the telephone line bandwidth, and thus its reception is an indication that an acceptable line for data has been established between the modems. Circuitry at both modems is responsive to the first and second tones for automatically verifying the existence of the desired communication link. Upon completion of data transmission, the modem itself will automatically disconnect the existing telephone line if the data terminal equipment associated with the modems does not have such capability.

18 Claims, 4 Drawing Figures

DATA MODEM HAVING LINE VERIFICATION AND AUTOMATIC DISCONNECT FEATURES

BACKGROUND OF THE INVENTION

1. Field of the Invention

The invention generally relates to data communication systems and more specifically relates to data modems adapted for two-wire/half-duplex operation through direct distance dialed networks.

2. Description of the Prior Art

The use of data modems to transmit data over ordinary telephone lines through direct distance dialed networks is today commonplace. Independent manufacturers of data modems today supply a large portion of modem equipment as compared with the past wherein telephone companies supplied virtually all the modem equipment. In today's marketplace, however, the independent modem manufacturers are still faced with the problem of establishing data connections through direct distance dialed (DDD) telephone lines and associated equipment as provided by telephone companies. Such telephone equipment is primarily designed for handling voice signals. Accordingly, much ingenuity is involved by the independent manufacturers of modems in adapting their products to provide maximum efficiency while operating over telephone equipment over which they have no control.

As an example, the independent manufacturers of modems must adapt their products to operate over long distance voice communication telephone networks. In such telephone networks, the telephone company introduces large amounts of amplification in a pair of separate two wire/one way paths located in the DDD networks. Conventional two-to-four wire hybrid circuits make a conversion between a two wire/two way circuit found at a location including a subscriber's telephone, or modem, and the pair of two wire/one way circuits normally found in the DDD networks between central offices. If these hybrid circuits were perfectly balanced, then no signal intended to be transmitted from a sending to a receiving line could reflect back into the input of the sending line. In actual practice, however, the numerous switching connections and varieties of trunks and subscriber lines make it impossible to have anywhere near perfect balance in the hybrid circuits. As a result, there is always some small amount of signal which loops around the pair of two wire/one way paths and is reflected back to the two wire/two way circuits at the subscriber locations. These reflected signals are termed "echo signals".

In order to avoid these undesirable echoes, DDD networks include echo suppressors. In normal operation, an echo suppressor provides a low impedance to a voice signal travelling in one direction via one two wire/one way path while simultaneously providing a high impedance in the other two wire/one way path of the network so that echoes of the voice signals are blocked.

When data transmission is involved, a particularly unique tone only is transmitted over the established direct distance dialed telephone line which is connected between two subscriber locations. The echo suppressors respond to the unique tone by assuming a disabled condition wherein the echo suppressors are effectively removed from the direct distance dialed network, i.e. they assume a low impedance in both directions.

The assignee of this invention has provided a dramatic increase in the data throughput of data through a direct distance dialed network when modems are operating in a two-wire/half-duplex mode. The invention, assigned to the same assignee as the present invention, has been termed "FASTAR" which is a trademark of the assignee of this invention. The FASTAR invention is fully described and claimed in U.S. Pat. No. 3,783,194 issued Jan. 1, 1974.

Briefly, the FASTAR invention generates a unique tone to initially disable the echo suppressors. Thereafter, whenever the network is free of data transmission in either direction, and the line must remain in a data transmission mode, a tone generator in a modem is enabled. The tone generator supplies a signal at a frequency which is outside the frequency range of data transmission, and it assures that energy is not absent from the network for a predetermined time which would cause the echo suppressors to again be enabled. This additional signal thus maintains the echo suppressors in a disabled condition during absence of data transfer in either direction. As a result of the FASTAR invention, data transmission is accomplished with reduced turn-around time, i.e. one modem can send data almost immediately after the other modem finishes sending a block of data.

Although dramatically improving data throughput, the FASTAR invention does require an operator to monitor the status of the modem and make a presumption that the echo suppressors have been disabled. Our invention not only obviates the requirement for an operator's attention to the modem, but in addition verifies that a line is established between communicating modems. Furthermore, our invention automatically verifies that the echo suppressors are disabled and an acceptable line for data communication exists between the modems.

SUMMARY OF THE INVENTION

The modems of our invention employ line verification circuits having an internal timing sequence to control sending and receiving of two unique tones. In freely interchangeable modems, the sending and receiving is mutually exclusive at each modem so that a modem isolates its own signals from being interpreted as though they have been received from the other modem. Both modems operate on a race principle wherein the first modem which receives a first unique tone inhibits further sending of that tone, and instead "listens" for receipt of a predetermined time duration of the first tone. The listening period is of sufficient duration to guarantee that the echo suppressors are disabled. The listening modem then "answers" with a second unique tone, which is at a frequency selected to be at the edge of the transmission bandwidth of the network. This other second tone, when received at the other modem, verifies that an acceptable two-way communication path exists between the two modems. Its presence keeps energy on the line to assure that the disabled echo suppressors remain disabled. After both modems have automatically verified the establishment of an acceptable two-way communication path, data set ready signals are delivered by the modems to their associated data terminal equipment. From that point on, the data terminal equipment and the data modems operate in well known normal routines for data transmission.

A further feature of this invention is that all modems may be made identical or a master/slave relationship is available within the scope of our invention. Having all modems identical is very important in replacement situations because there need be no concern whether or not the replacement modem has exactly the same configuration as to operation, strap options, and the like. Master/slave configurations, on the other hand are simpler in operation and involve less circuitry.

DESCRIPTION OF THE PREFERRED EMBODIMENT

Figure 1:
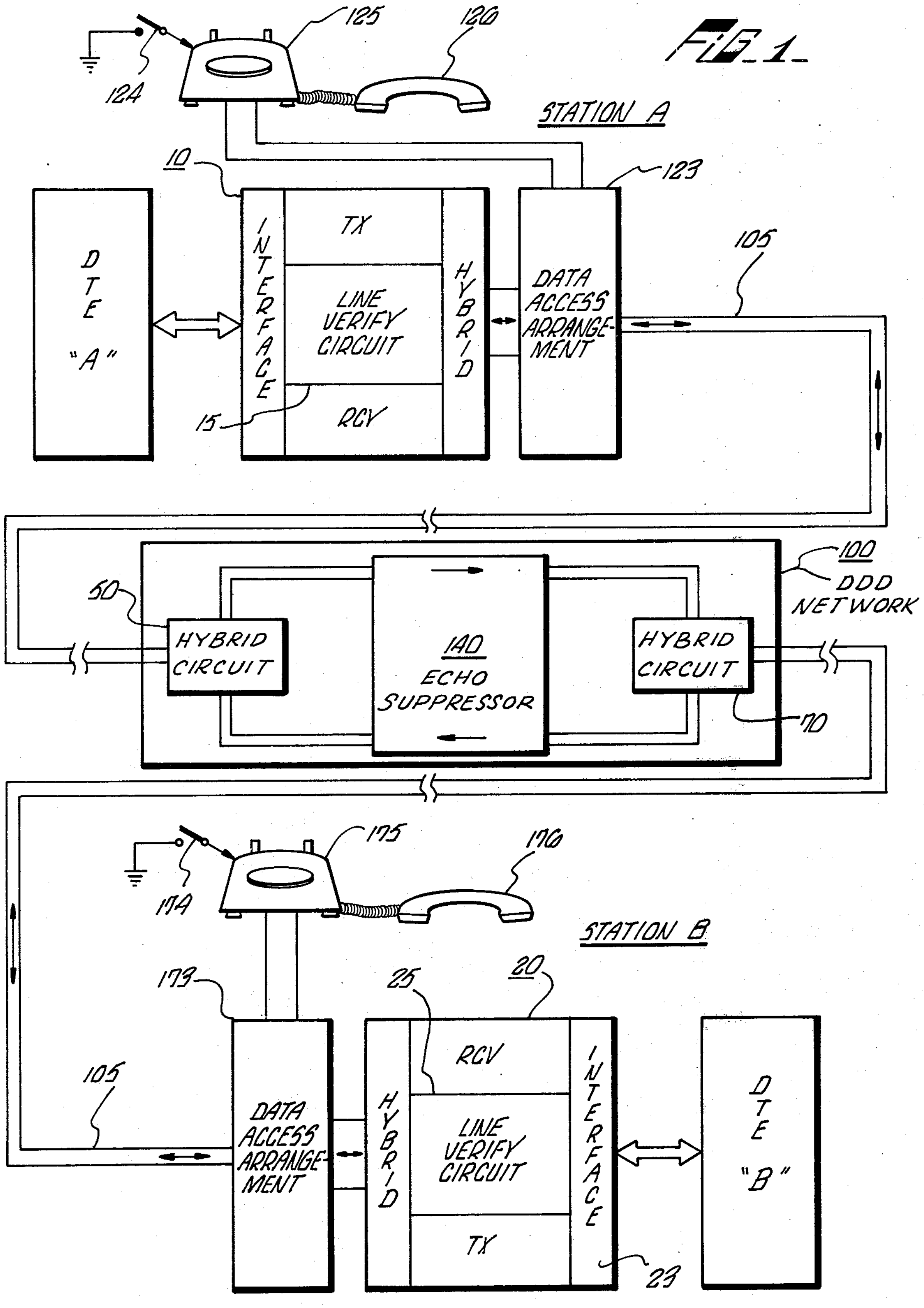
FIG. 1 discloses a two-wire/half-duplex operational mode for two modems connected together over a direct distance dialed network. Each modem is interchangeable and incorporates line verify circuits of this invention.

Turning now to FIG. 1, a block diagram of two subscriber locations, station A and station B is depicted. At both stations, a data terminal equipment (DTE), a modem, and a telephone set with its associated data access arrangement (DAA) are depicted. The telephone set, such as 125 at station A, may be any standard telephone set equipped with an exclusion key 124. An exclusion key is a manually operable switch which at an appropriate time is moved by an operator to switch from a voice condition to a data condition. Connected to the telephone 125 is a manual DAA or an automatic DAA of a well known type as described, for example in Bell System Technical References entitled "Data Couplers CBS and CBT for Automatic Terminals", August 1970 and "Data Access Arrangement CDT for Manual Originating and Answering Terminals", May 1971.

Operational details for the exclusion key, the telephone set and the DAA's are fully described in the aforementioned publication and the details need not be described here. Such equipment provides functions and signals which are incidental to an explanation of this invention; and briefly stated, an operator employs the telephone set with its DAA to establish a telephone line connection first for voice and then for data transmission between stations A and B. In order for the operator to establish a path through DDD network 100, he dials the called station such as station B. Once voice communication between the operators at stations A and B has been established, the operators agree to transfer the telephone line from voice to data handling status by each switching the exclusion keys 124 and 174.

In the event that DAA 123 and DAA 173 are of the manual type, they respond to the exclusion key closure by simply transferring the telephone lines 105 to the data modems. If the DAA 123 and DAA 173 are of the automatic type, they emit a signal indicative of that transfer. Such a signal is known in the industry as CCT (coupler cut through).

The telephone and DAA equipment additionally provide a loop holding path for accounting and supervision by the telephone company. In that regard, once data transmission is finished by both modems, a DTE of a particular type may apply a disconnect signal through the modem to the DAA so that the telephone line is released. If the DTE is of a type which does not provide such a signal, the line verify circuit of this invention includes an automatic disconnect feature. The automatic disconnect commands the DAA to release the telephone line when there is an absence of data transmission for a predetermined time.

In the description thus far, it is clear that the operators at both stations A and B have initiated the call and have cut the telephone line through to modems 10 and 20. At this point in prior art systems, the operators do not know whether the echo suppressors have been removed from the telephone line, nor do they know for a fact whether or not a two-way data path through the DDD network 100 actually exists. Furthermore, the operators have no assurances that the echo suppressors are disabled for proper data transmission. In this latter regard, it must be kept in mind that voice communication may take place (when data would not) because the echo suppressors functioning in a normal voice operation turn around and accomplish their echo suppressing function to voice. It is thus a feature of this invention that modems 10 and 20 employ automatic verification circuits 15 and 25 to determine that a proper two-way communication path is available for data transmission through DDD network 100.

Briefly, the line establishment verification circuit of this invention alternately sends out and listens for a unique tone that is selected to have a frequency capable of disabling all echo suppressors such as 140 in the DDD network 100. Both modem line verification circuits 15 and 25 are purposely designed as asynchronous in order to avoid any possibility that both modems lock up. By lock up, it is meant that both modems are each simultaneously sending and simultaneously listening for the other. To avoid that possibility, the first line verification circuit that receives a unique first tone, quits transmitting its own first tone. That first modem, rather than transmitting its first tone any longer assumes a listening mode of operation.

After a predetermined time burst of the first tone has been received by the first modem from the other modem's line verification circuit, the first modem then answers with a second unique tone. The second unique tone is transmitted over the telephone line for a predetermined period. The second tone is selected near the edge of the telephone lines' bandwidth. Accordingly, when it is received it is a good indication that not only are the echo suppressors disabled but the transmission line is of sufficient quality for data transmission. A bad or marginal line would so severely attenuate the second tone that it might not be properly received.

Figure 2:
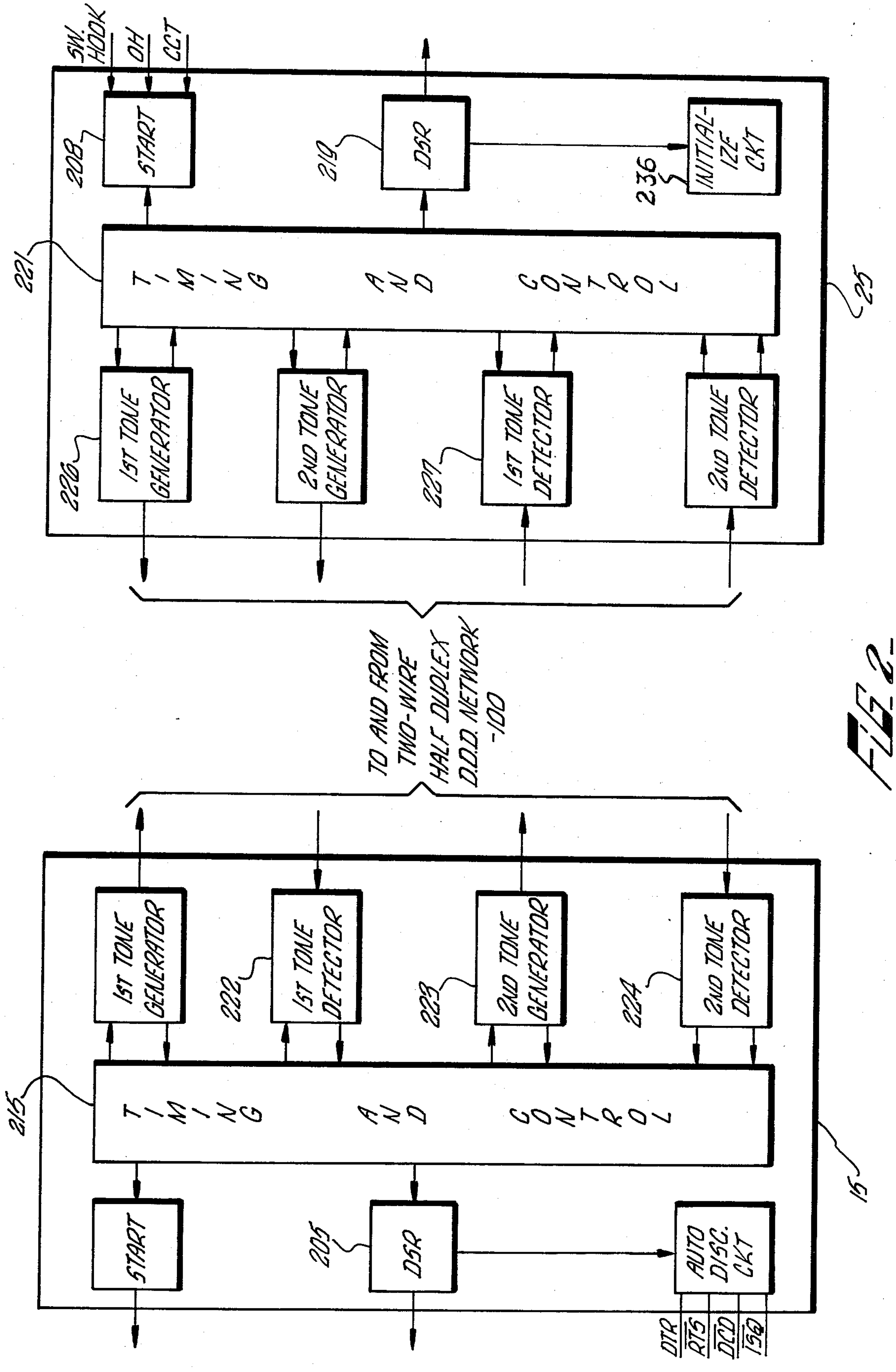
FIG. 2 is a block diagram of the line verify circuits of FIG. 1.

FIG. 2 discloses a detailed block diagram of line verification circuits 15 and 25 of FIG. 1. Since both circuits 15 and 25 are identical, only the operation of circuit 25 is described in detail. Line verification circuit 25 includes a timing and control logic circuit 221. Control circuit 221 is asynchronous with respect to timing and control circuit 215 at line verification circuit 15. Control circuit 221 includes an on/off timing cycle which alternately energizes and inhibits a first tone generator 226. The tone generator 226 responds to timing and control circuit 221 by emitting a first tone for a predetermined time duration.

The time duration has been selected to be approximately 800 ms. on and 800 ms. off. The frequency of the first tone has been selected at 2025 Hz. These parameters are both selected to guarantee that all echo suppressors in the DDD network 100 are disabled in the manner fully described in the aforementioned FASTAR patent. Similarly, a corresponding first tone is also sent from modem 10 at station A and it may be received by modem 20 at station B provided that modem 20 is listening. In order to detect that first tone, control circuit 221 at station B during the time that its tone generator 226 is disabled, enables the first tone detector 227.

If the first tone is not detected by enabled detector 227, then timing control 221 re-enables the first tone generator 226 to again transmit its first tone. At both ends of the telephone network, line verification circuits 15 and 25 are involved in this alternate send and receive operation. It is now clear why the timing sequence controls 221 and 215 are deliberately made asynchronous. In this manner, both modems do not get locked together in a mode wherein both are simultaneously sending and receiving.

Because of the asynchronous timing, the controls 221 and 215 drift apart in a matter of a few hundred milliseconds. As a result of that drift, assume that line verification circuit 15 at station A is the first circuit to send out its first tone. That first tone from line verification circuit 15 is assumed to start some 20 to 50 ms. ahead of the time that line verification circuit 25 at station B is scheduled to start sending its first tone. Circuit 25 at modem 20 is listening for the first tone. That first tone from modem 10 is thus detected by the tone detector 227 and modem 20 has won the race. Accordingly, modem 20 becomes a master and its line verification circuit 25 stops sending its first tone and instead remains in a listening mode.

Approximately 400 ms. of the first tone must be received by circuit 25 in order for modem 20 to verify that all echo suppressors are disabled. After that 400 ms. interval has elapsed, then line verification circuit 25 sends out a predetermined time burst of the second tone. That burst is received at modem 10 and is responded to by the second tone detector 224. Control circuit 215, in turn, enables the data set ready (DSR) circuitry 205 causing it to emit a DSR signal to DTE "A".

Meanwhile at modem 20, the generation of the 2900 tone was possible only because 400 ms. or more of 2025 Hz tone got through the DDD network 100. Accordingly, timing control 221 also enables its data set ready circuit 219, and circuit 219 delivers a DSR signal to DTE "B".

The transmit and receive portions of modems A and B proceed with normal modem operation after line verification. Various equalization and data message swapping operations take place between modems 10 and 20. Such operations are fully described in another patent application concurrently filed herewith and assigned to the same assignee as the present invention listing Richard Borysiewicz and Charles W. Roedel as inventors, and entitled DATA MODEMS WITH AUTOMATIC EQUALIZATION, DROP-OUT DETECTION AND DATA ECHO PROTECTION, Application Ser. No. 438387, filed Jan. 31, 1974.

Although the aforementioned patent application describes both a four-wire/full-duplex and a two-wire/half-duplex operation, this invention is applicable only with two-wire/half-duplex operation. In a two-wire operation, referring to FIG. 3, the line verification sequence is always generated by a power clear pulse delivered in a well known manner by modem 20 to OR gate 305 located at the lower center of FIG. 3. This power clear pulse causes four control flip flops 309, 417, 332 and 408 to assume an initial, or reset conditions. Connected to control flip flop 332 is an OR gate 311 depicted at the top of FIG. 3. The center lead input to OR gate 311 is at logic 0 due to the reset condition in flip flop 332. The lower input of OR gate 311 is also at logic 0 because there is no 2025 Hz tone being received. OR gate 311 thus awaits the state of the uppermost input from start circuit 208 in order to enable timer 310 via inverter 410. The start command input to OR gate 311 from circuit 208, in turn, is determined by the status of the data coupler operation described earlier.

It is necessary to consider a difference in operation between manual and automatic couplers. The switch, or strap, labelled 414 is connected to assume either a manual or automatic mode depending upon the applicable equipment being employed. If switch 414 is in the manual mode, then OR gate 412 receives a positive or true output signal (logic 1) which signal in turn is inverted to a negative, or false, signal by inverter 411. Accordingly, all three inputs to OR gate 311 are at logic 0 status. That status is inverter by inverter 410 to start the operation of the 800 ms. on/off timer 310.

If an automatic coupler is being employed, then switch 414 is moved to the lower signal terminal marked logic 0. When strap 414 is in the auto DAA position, in order to get proper starting conditions, AND gate 355 must have all inputs at a logic 1. The three inputs to AND gate 355 are determined by the status of off hook, switch hook and CCT all as described in detail in the referenced publications. If all three signals present are a logic 1 condition, it means that the coupler has been cut through, that the off hook flip flop (not shown on this drawing) is set and the coupler exclusion key is in the data mode, (i.e. switch hook is down). With all three of these conditions met, then all three inputs to OR gate 311 are again at a logic 0 which causes the output of inverter 410 to go positive. Inverter 410 in this instance also causes the 800 ms. timer 310 to operate.

Thus, in either instance, (based on the type of data coupler employed) timer 310 provides an 800 ms. ON followed by an 800 ms. OFF period. The ON period is labelled at output lead 314 as send 2025. Whenever that signal is at logic 1, the first tone generator 226 produces an echo suppressor disabling tone on line.

When generator 226 is producing the 2025 Hz tone, inverter 400 delivers an inhibit command 315 to the analog switch 325. Switch 325 is connected between the telephone network 100 and the 2025 Hz detector 227. When inhibited, switch 325 prevents any energy from the telephone line 100 from entering the 2025 detector 227. This operation thereby insures that the detector 227 is not triggered by the 2025 Hz tone produced from its own tone generator 226.

Timer 310, in the manner described, produces alternating 800 ms. periods of sending 2025 Hz and then listening for 2025 Hz by virtue of enabling analog switch 315. This alternating operation continues indefinitely until the line is established. Once the line is established, the modem signals from station A may be received at station B and vice versa.

The asynchronous nature of the 800 ms. timers at both modems may be fully appreciated by assuming first that modem 10 at the other end of the line has produced a 2025 tone at a time when analog switch 325 is enabled. That tone is detected by detector 227. Assume that detector 227 has just received, the first or leading edge of the 2025 tone as a signal on lead 402. The true signal on lead 402 performs the following functions: First, by virtue of OR gate 311, it causes an immediate inhibit to the 800 ms. timer 310; Second, it causes the 400 ms. timer 328 to begin timing; and Third, it produces a small pulse on its leading edge, via circuit 404, whose output is coupled in through OR gate 305 to insure the reset condition of the four control flip flops 408, 332, 309 and 417. This reset operation is a redundant guarantee that the start or initial condition is met without any possibility that stray signals may have disrupted the true initial conditions of the four control flip flops. The 400 ms. timer 328 will complete its timing if a sufficient duration of 2025 Hz tone is received. When timer 328 times out, a leading edge pulse circuit 403 produces a pulse to AND gate 407. AND gate 407 is enabled provided that the 2025 Hz tone is still present when the pulse from 403 occurs. Enabled AND gate 407 causes flip flop 408 to be switched to a set, or 1, state.

Control flip flop 408 in a set state does three things:

1. By virtue of OR gate 409, it sets flip flop 332 to a set state. The output signal from flip flop 332 permanently disables the 800 ms. timer 310;

2. Via AND gate 401, if satisfied, a send 2900 command is issued to start sending a 2900 Hz tone generator 228; and 3. A 130 ms. timer 329 is enabled and starts a time-out sequence.

When AND gate 401 delivers a positive send command to generator 228 it produces a 2900 Hz tone on line. That send command through inverter 338, is inverted by inverter 338. The inverted signal causes a disable to an AND gate 405 so that any signal which may be received by the 2900 Hz tone detector 229 is ignored.

Tone generator 228 continues to place a 2900 Hz tone on line during the time that timer 329 is timing out. Once timer 329 completes its time-out, a leading edge pulse circuit 333 develops a pulse which is transferred through OR gate 415 in order to set the data set ready flip flop 309 to a 1 state.

As soon as flip flop 309 is set, its zero output terminal goes to a logic 0, and thereby disables AND gate 401. Disabling AND gate 401 causes cessation of the 2900 Hz tone from generator 228.

The operation thus far has provided the following states on the control flip flops: (1) Flip flop 408 is still set, however its output is not performing any function at the moment; (2) Flip flop 332 is still set and its output is giving a permanent inhibit function to the 800 ms. timer; (3) Flip flop 309, the DSR flip flop, has been set so as to deliver DSR to DTE "B", as well as to the rest of the modem; and (4) Flip flop 417 has now been reset by the DSR signal via OR gate 416. The explanation of the function of the flip flop 417 is reserved for a discussion of the automatic disconnect feature described hereinafter.

Figure 3:
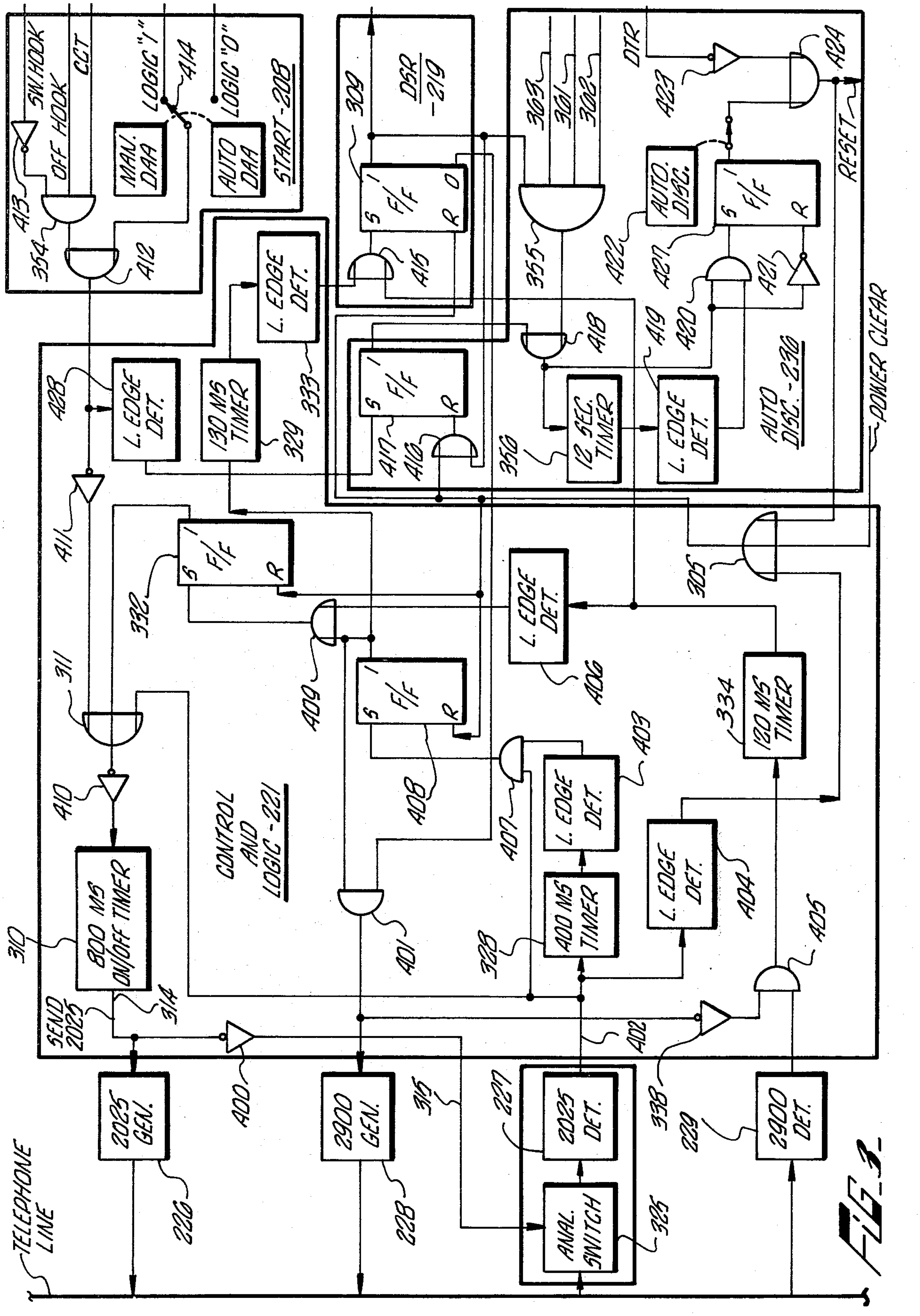
FIG. 3 is a combined block and logic schematic of one of the line verify circuits of FIG. 2.

Recall that it was an original assumption that modem 10 at the other end of the line caused the 2025 Hz tone to be generated during the time that modem 20's 2025 detector 227, FIG. 3, was listening. Now reverse that assumption and presume that the 2025 detector 222, FIG. 2, at the far end of the line has detected a 2025 Hz tone from generator 226, FIG. 3. The line verification circuit 15 goes through the same cycle of operation as just described for line verification circuit 25 of modem 20. As a result, a second tone generator 223, FIG. 2, causes its 2900 Hz tone to be sent to modem 25 for its 130 ms. time cycle. Since line verification circuitry 25, FIG. 3, is not sending 2900, AND gate 405 is enabled and the 2900 Hz tone from the other end, once received by tone detector 229, causes a 120 ms. timer 334 to be activated.

Timer 334 produces an output at the end of 120 ms. in order to accomplish two functions: (1) By way of leading edge pulse circuit 406, it sets control flip flop 332. Again this flip flop 332 causes the 800 ms. timer to be turned off and kept in an off condition; (2) The Data Set Ready flip flop 309, via OR gate 415 goes to a set condition. Accordingly, a DSR signal is again delivered to DTE "B", and normal data transfer may thereafter take place.

Refer to FIG. 1 for an explanation of a further feature of this invention. If DTE "B", for example, is a type of terminal known in the prior art as an intelligent terminal, then once data modem 20 completes its data transmitting and receiving functions DTE "B" issues a DTR signal. DTR, standing for data terminal ready, is a signal from the digital terminal equipment. It is normally employed to signify that data transfer is completed and the telephone line should be disconnected. DTR, as known, is true when data is being handled and drops false when data message transmission is concluded.

With reference to FIG. 3, as soon as DTR drops false by DTE "B", inverter 423's output goes high. That high condition is passed through OR gate 424, and is used to reset an off hook flip flop (not shown in the drawing). Concurrently, the output of inverter 423 via OR gates 424 and 305 functions as an initiate signal to reset control flip flops 309, 332, 408 and 417 in the manner earlier described.

In the case of an automatic DAA, the off hook flip flop disconnects the telephone line. In a manual DAA environment, the operator must actually hang up the telephone hand sets 126 and 176 on the cradle of telephones 125 and 175. As a further alternative, in the case of an automatic DAA, there are certain instances where the DTE does not have internal hardware that drops the DTR signal when a call is finished. Therefore, our invention provides a solution for that problem in that an automatic disconnect circuit 236 is internally supplied by the modem itself.

Our automatic disconnect circuit 236 monitors certain signals and by virtue of this monitoring can determine whether either of the data terminal equipment is causing data to be transferred from one end or the other. This monitoring is done by using AND gate 355 which monitors four terms; namely, $\overline{\text{RTS}}$ 363, $\overline{\text{DCD}}$ 361, $\overline{\text{Integrated Signal Quality}}$ 362, along with a DSR signal from flip flop 309. Any time that DSR is up or true, there will be at least one of the other three inputs in a logic 0 conditions as long as data is being transmitted and/or received.

However, an absence of RTS from either terminal also results in an absence of DCD and Integrated Signal Quality from the modem as is fully described in detail in the aforementioned co-filed application. AND gate 355 in such an instance has all four inputs in a true condition which results in a positive output through OR gate 418. Such a positive signal causes a 12 second timer 356 to start a time-out sequence. If at any time during the 12 second time-out, one or more of the inputs to AND gate 355 drops false, then timer 356 is immediately reset in a known manner and no further timing function will continue. However, if timer 356 is allowed to time for a full 12 seconds, then upon time-out, it produces a pulse through leading edge detector 419. Detector 419 supplies a pulse to AND gate 420 which, provided the output of OR gate 418 is still at a logic 1, causes flip flop 427 to be set. A set condition in flip flop 427, via strap 422, results in a true condition to be passed through OR gate 424. An output from 424 performs an automatic disconnect function. That disconnect signal from OR gate 424 also causes all four control flip flops to be reset in the manner earlier described.

Resetting the flip flops results in DSR going false. Thus, AND gate 355 receives at least one false or logic 0 term, and in accordance with the operation just described, the time command for timer 356 goes false. An inverter 421 is responsive to that false condition to produce a reset command for flip flop 427. Flip flop 427 is thereby returned to its initial condition. In summary, the automatic disconnect feature of this modem automatically causes DSR to be dropped, and also causes the off hook flip flop to be reset. Hence, the telephone call, via the DAA is disconnected.

In the case of an automatic DAA, it is desirable that the length of time between when the coupler establishes a telephone connection to the modem and the period of time in which DSR goes true should be as limited as possible because occasionally the DAA may receive an improperly dialed call. If such an event occurs, the telephone may end up being held by virtue of some improper call reaching modem 20's number. The line verify operation, of course, would never be completed because of the absence of line verify circuitry from the calling station. It is imperative that the wrong-dialed modem automatically release the connected line. Flip flop 417 provides the ability to automatically terminate a wrong-number call. This feature of our invention is provided by leading edge pulse detector 428 emitting a pulse when the start circuit 208 responds to the coupler in the manner fully described previously. An output pulse from detector 428 sets flip flop 417. A set condition in flip flop 417, through OR gate 418, immediately starts the 12 second timer 356. A line verification normally occurs in less than a second or so, but in any event, must occur in significantly less than the 12 second time-out allotted for timer 356. However, if a wrong number is called and it is impossible to establish a line verify operation, then the 12 second timer 356 completes its full time-out. Upon time-out, timer 356 produces a pulse, in the manner described previously, which both resets the off hook flip flop (not shown) and pulses OR gate 305. OR gate 305 resets all four control flip flops to their initial condition so that line verification circuitry 25 is in proper condition to await another call to come in.

While the advantages of having the line verification circuitry of this invention identical for easy interchangeability with all modems has already been stressed, it should be understood that there are instances wherein a master/slave modem configuration is not objectionable. The principles of this invention are equally applicable for such a master/slave configuration. In fact, the master/slave configuration saves a considerable amount of circuitry and results in simplicity of operation. It is objectionable, however, from the standpoint of increased inconvenience in replacement situations.

Figure 4:
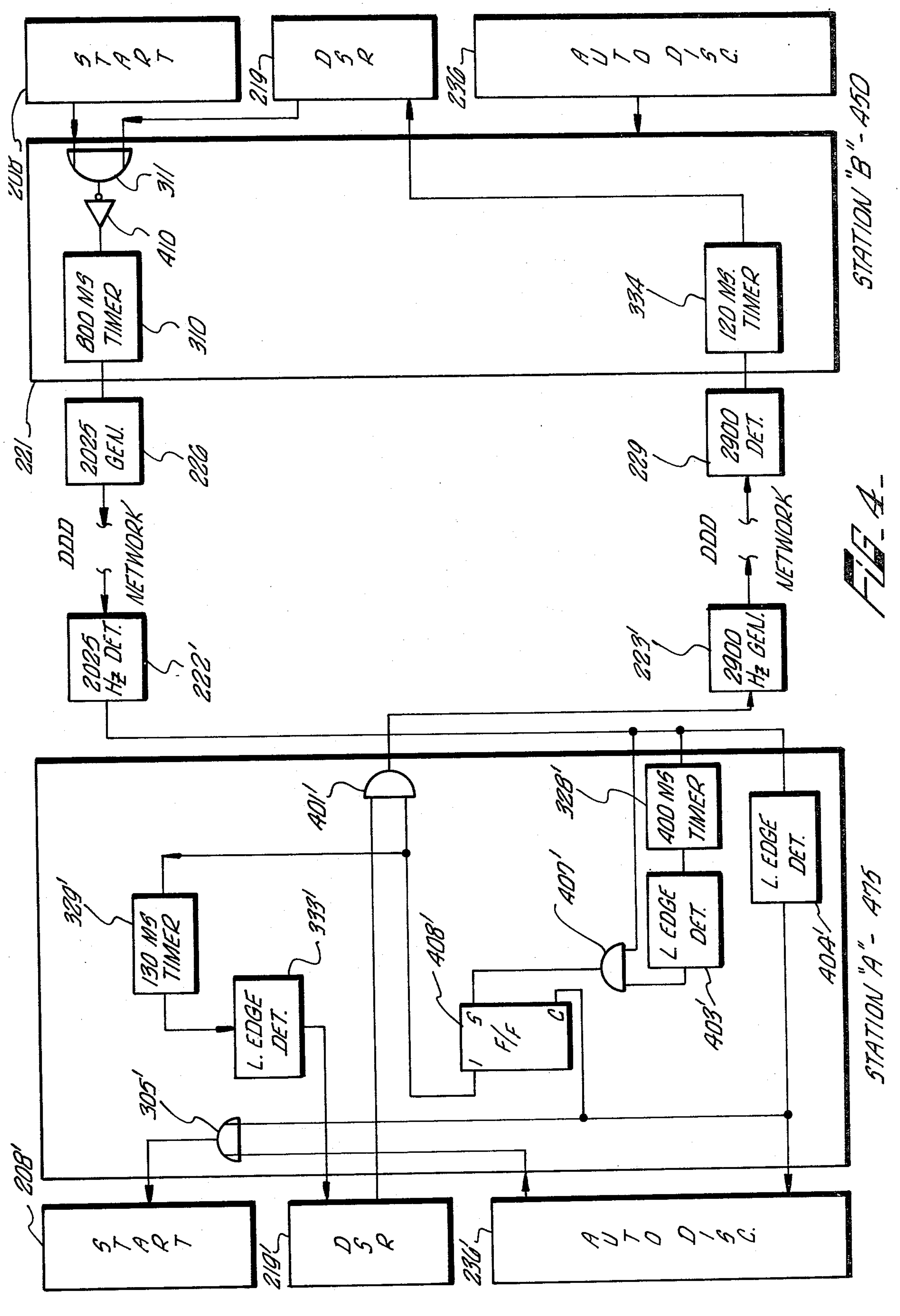
FIG. 4 is a combined block and logic diagram of line verify circuits of this invention operating in a master/-slave modem situation.

In FIG. 4, a "master" line verification circuit 450 is depicted at station B and a "slave" line verification circuit 475 is shown at station A. Station A and B are again connected together through a two-wire/half-duplex DDD network 100. Because of the identity of functions of the circuits employed in FIG. 4 as compared with FIG. 3, the same numbers have been used in FIG. 4 to designate the same components in FIG. 3. At slave station A, a prime is added to the numbers of FIG. 3.

At the master location of station B, start circuitry 208 starts the operation when DSR is down and the DAA conditions are proper as earlier described in conjunction with FIG. 3. Control and logic circuitry 221 in response to the start command enables a first tone generator 226, which tone generator emits a 2025 Hz tone continuously when DSR is in a 0 state. The tone from generator 226 is applied to DDD network 100.

Also at the master site is a 2900 detector 229 which continuously listens for a 2900 Hz tone. Accordingly, the master line verification circuitry 450 continuously sends 2025 Hz and continuously listens for a 2900 Hz tone. Connected to the output of the 2900 Hz detector 229 is a 120 ms. timer 334. When a 2900 Hz tone is detected for at least 120 ms., the output of timer 334 sets the data set ready F/F to a 1 state in DSR circuit 219 as earlier described. A DSR signal is delivered in DTE "A"; and, via OR gate 311 and inverter 410, timer 310 is permanently disabled until the line verification cycle repeats itself.

At slave location at station A, line verification circuitry 475 includes a 2025 Hz detector 222' which is continuously listening for a 2025 Hz tone. Upon receipt of a tone at detector 222', leading edge detector 404' clears control F/F 408' and signals auto-disconnect circuit 236'. In addition, an output from the 2025 Hz detector 222' enables a 400 ms. timer 328'. The timer 328' times out if the 2025 Hz tone is detected by detector 222' for at least 400 ms. When timer 328' times out, a leading edge detector 403' pulses AND gate 407'. Provided that detector 222' is still detecting a 2025 Hz tone, as earlier described, AND gate 407' is satisfied and causes control F/F 408' to be set to a 1 state. DSR circuit 219' includes a flip flop whose 0 state delivers a true, or enabling, signal to AND gate 401'. That enabling signal coincident with a 1 state in flip flop 408' enables AND gate 401' in order to apply a send command to the 2900 Hz tone generator 223'.

Also connected to the output of the 1 terminal of flip flop 408' is 130 ms. timer 329' which starts timing when flip flop 408' is set to a 1 state. As timer 329' times out, a leading edge detector 333' pulses DSR circuit 219' which sets the DSR flip flop and delivers a DSR signal to DTE "B". Setting the DSR flip flop removes the enabling condition for AND gate 401' and tone generator 223' is disabled. Thus, in the master/-slave situation an automatic line verification operation is readily and simply provided in accordance with the principles of this invention.

It is to be understood that the foregoing features and principles of this invention are merely descriptive, and that many departures and variations thereof are possible by those skilled in the art, without departing from the spirit and scope of this invention.

What is claimed is:

1. In a data communication system wherein a call is placed through a direct distance dialed network, which call seeks to establish a telephone line which includes echo suppressors between a first and second data modem adapted for two-wire/half-duplex operation, line verification circuitry for said modems which comprises:

first tone generating means at said first modem emitting a first unique tone for disabling the echo suppressors in said telephone line;

means at said second modem enabled by said first tone being received for a predetermined time duration sufficient to disable said echo suppressors, for emitting a second tone; said second tone being distinct from said first tone, and characterized as incapable of disabling said echo suppressors but capable of transmission through said telephone line when said echo suppressors are disabled; and means at said second modem responsive to the enablement of said second tone emitting means for indicating that a two-way telephone line with disabled echo suppressors has been established between said first and second modems.

2. Line verification circuitry in accordance with claim 1 and further comprising:

means at said first modem enabled when said second tone is received for a predetermined time duration, for indicating that a two-way telephone line with disabled echo suppressors has been established between said first and second modems.

3. Line verification circuitry in accordance with claim 1 wherein a call placed through said telephone line is connected to said first and second data modems for data transmission access by data terminal equipment, and further comprising:

means in both of said first and second modems each responsive to application of modem power for setting an indicating device in an initial first state capable of delivery of a signal to said data terminal equipment than its data modem is not in a ready state to accept data.

4. Line verification circuitry in accordance with claim 3 wherein said means for indicating that a two-way telephone line is established between the modems further comprises:

means for setting said indicating means to a second state indicative that both modems are in a ready state to accept data.

5. Line verification circuitry in accordance with claim 4 and further comprising:

means in each modem for monitoring whether or not its associated data terminal equipment is receiving or transmitting data; and means in each modem responsive to the absence of any data transmitted or received for a predetermined time for automatically delivering an output signal indicative that the telephone line is to be disconnected from said modems.

6. Line verification circuitry in accordance with claim 2 wherein:

said first modem is the modem for initiating a line verification operation, and said second modem is subservient to said first modem.

7. Line verification circuitry in accordance with claim 1 wherein said echo suppressors are adapted to be disabled by an echo suppressor disabling tone of about 2025 or 2225 Hz when applied thereto for a period of approximately 400 to 800 ms., and wherein:

said first tone generating means emits a tone only selected at said disabling frequency for disabling said echo suppressors; and further comprising means for continuously applying the output frequency from said first tone generating means to said telephone line until the line is verified as connected between the first and second modems with echo suppressors disabled; and thereafter interrupting the application of said disabling frequency during data transfer between said modems.

8. Line verification circuitry to verify connection of a telephone line between first and second modems, said modems respectively comprising:

first and second generating means for emitting a unique signal capable of disabling echo suppressors in said telephone line when applied to said line from either modem;

first and second detection means for detecting the unique tone when received over said telephone line;

third and fourth generating means emitting a signal distinct from said unique tone in response to receipt of said unique tone by said unique tone detecting means;

third and fourth detecting means for detecting said distinct signal;

timing control means operative at the modem first detecting said unique tone for disabling that modem's unique tone generating means and enabling that modem's distinct tone signal generating means only after said unique tone has been detected for a predetermined time duration that assures disablement of said echo suppressors; and means at the other modem responsive to receipt of said distinct signal for verifying that a two-way telephone line with disabled echo suppressors has been established between said first and second modems.

9. Line verification circuitry in accordance with claim 8 and further comprising:

indicating means at each modem initially set in a state indicative that the respective modems are not ready to transmit data;

means at said other modem responsive to said verifying means for setting said indicating means at said other modem in a state indicative that the modem is ready to transmit and receive data; and means at the first operative modem responsive to receipt of said unique tone for said predetermined time duration and the enablement of its distinct tone generating means for setting the indicating means at said first operative modem in a state indicative that the modem is ready to transmit data.

10. Line verification circuitry in accordance with claim 8 wherein said timing control means further comprises:

a first timing control circuit at said first modem;

a second timing control circuit at said second modem asynchronous with respect to said first timing control circuit; and first and second means responsive to said first and second timing control circuits at said first and second modems respectively for alternately and asynchronously enabling and disabling the unique tone generating and detecting means at both modems.

11. Line verification circuitry in accordance with claim 8 and further comprising:

means in each modem for monitoring whether or not its associated data terminal equipment is receiving or transmitting data; and means in each modem responsive to the absence of any data transmitted or received for a predetermined time for automatically delivering an output signal indicative that the telephone line is to be disconnected from said modems.

12. Line verification circuitry in accordance with claim 11 and further comprising:

means operative when one line verification circuit only is connected to said telephone line for automatically disconnecting said telephone line from said modem after a predetermined time interval elapses.

13. A data communication system including data modems adapted for operation in a two-wire/half-duplex mode over a direct distance dialed telephone line network; which network includes echo suppressors that may be disabled by an echo suppressor disabling tone to remove high attenuation to data flow in both directions over the network, the improvement comprising:

means at one of said modems for automatically transmitting only a first unique tone of a given duration for initially disabling all echo suppressors in said network;

means at one other modem connected to receive said first tone for a given time duration when a telephone line is physically connected between the modems and the echo suppressors are disabled in the line;

means at said other modem responsive to said first tone receiving means for automatically transmitting a second tone of a given duration indicative that said first unique tone was received;

means at said other modem responsive to receipt and transmission of said first and second tones respectively for emitting a signal indicative of the establishment of a two-wire/half-duplex telephone line with echo suppressors disabled; and means at said one modem responsive to the transmission of said first tone and to receipt of said second tone for emitting a signal indicative that a two-wire/half-duplex telephone line with disabled echo suppressors exists between said modems.

14. Line verification circuitry in accordance with claim 13 and further comprising:

means at said other modem for also generating a unique tone for disabling echo suppressors in said telephone line.

15. Line verification circuitry in accordance with claim 14 wherein said first tone generating means at said one modem is alternately enabled and disabled, and further comprising:

means at said one modem for detecting said unique tone when received over said telephone line from said other modem; and first timing means at said one modem for enabling said first tone detecting means only when said first tone generating means is disabled.

16. Line verification circuitry in accordance with claim 15 wherein said unique tone generating means at said other modem is alternately enabled and disabled, and further comprising:

a detection circuit for detecting, when enabled, the unique tone received from said one modem over said telephone line; and second timing means at said other modem for enabling said unique tone detecting means only when said unique tone generating means at said other modem is disabled.

17. Line verification circuitry in accordance with claim 13 and further comprising:

means at said one modem associated with said first tone generating means for alternately enabling said first tone generating means for a time duration sufficient to disable said echo suppressors and then disabling said first tone generating means to establish a listening time interval for said unique tone to be received at said one modem;

means at said one modem for detecting said unique tone when received from said other modem;

means at said one modem for determining the length of time of receipt of said unique tone and emitting a command if the unique tone exceeds a predetermined time interval;

means at said one modem responsive to said command from said time determining means for emitting a second distinct tone from said one modem if said one modem is the modem that first responds to receipt of said unique tone.

18. Line verification circuitry for first and second data sets capable of connection together through a telephone line which includes echo suppressors that are adapted to be disabled by a unique echo suppressor disabling tone so that data provided from data terminal equipment can be transmitted between said data after said data sets assume a data set ready condition, said verification circuitry comprising:

means at first data set for emitting said a first tone to disable said echo suppressors;

means at said first data set responsive to receipt of a second signal for delivering a first data set ready signal;

means at said second data set responsive to receipt of said first tone for emitting said second signal to maintain the echo suppressors in a disabled condition; and means at said second data set for delivering a second data set ready signal after emission of said second signal.

* * * * *

UNITED STATES PATENT AND TRADEMARK OFFICE
CERTIFICATE OF CORRECTION

PATENT NO. : 3,927,265

DATED : December 17, 1975

INVENTOR(S) : Charles W. Roedel and Richard Borysiewicz

It is certified that error appears in the above-identified patent and that said Letters Patent are hereby corrected as shown below:

Claim 5, line 56, "modern" should read -- modem --

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*